(12) United States Patent
Huang

(10) Patent No.: US 6,826,628 B2
(45) Date of Patent: Nov. 30, 2004

(54) PCI-PCMCIA SMART CARD READER

(75) Inventor: Yishao Max Huang, San Jose, CA (US)

(73) Assignee: O2Micro International Limited, Grand Cayman (KY)

( * ) Notice: Subject to any disclaimer, the term of this patent is extended or adjusted under 35 U.S.C. 154(b) by 454 days.

(21) Appl. No.: 10/047,518

(22) Filed: Oct. 26, 2001

(65) Prior Publication Data

US 2003/0084227 A1 May 1, 2003

(51) Int. Cl.[7] .................. G06F 13/00; G06F 13/38; G06F 3/00
(52) U.S. Cl. ................ 710/2; 710/8; 710/38; 710/62; 710/64; 710/72; 710/100; 710/104; 710/300; 710/301; 710/302; 710/305; 710/306; 710/311; 710/315; 712/32; 712/34; 712/36; 712/38
(58) Field of Search ............... 712/32–36, 38; 710/2, 8, 12, 31, 38, 62, 64, 72–74, 100, 104, 300–302, 305, 306, 309, 311, 312, 313, 315–317

(56) References Cited

U.S. PATENT DOCUMENTS

| | | | |
|---|---|---|---|
| 5,555,510 A | 9/1996 | Verseput et al. | 364/514 |
| 5,630,174 A * | 5/1997 | Stone et al. | 710/63 |
| 5,650,955 A * | 7/1997 | Puar et al. | 365/51 |
| 5,671,368 A | 9/1997 | Chan et al. | 395/282 |
| 5,870,570 A | 2/1999 | Chambers et al. | |
| 5,915,103 A | 6/1999 | Chambers et al. | |
| 5,960,213 A | 9/1999 | Wilson | |
| 6,108,738 A | 8/2000 | Chambers et al. | |
| 6,321,287 B1 * | 11/2001 | Rao et al. | 710/260 |
| 6,558,049 B1 * | 5/2003 | Shin | 710/30 |
| 6,647,434 B1 * | 11/2003 | Kamepalli | 710/14 |
| 6,664,969 B1 * | 12/2003 | Emerson et al. | 345/544 |

OTHER PUBLICATIONS

"PCI System Architecture", fourth edition, Chapters 17 and 18, MindShare Company, 1999.

* cited by examiner

*Primary Examiner*—Jeffrey Gaffin
*Assistant Examiner*—Tanh Q Nguyen
(74) *Attorney, Agent, or Firm*—Grossman, Tucker, Perreault & Pfleger, PLLC

(57) ABSTRACT

A method and apparatus is disclosed for implementing an integrated video card and smart card reader. A single processor is used to perform both video and smart card reader functions. The processor simulates a PCI-to-PCMCIA detection logic scheme. An operating system, such as Windows, detects both a video card and a PCI-to-PCMCIA bridge. A smart card reader is attached to the integrated video card and smart card reader.

17 Claims, 3 Drawing Sheets

PCI-PCMCIA SMART CARD READER

TECHNICAL FIELD

The invention relates to smart card readers. More particularly, the invention relates to an apparatus and to a family of methods that integrates a smart card reader into an existing PCI interface chip set.

DESCRIPTION OF THE PRIOR ART

The use of secure smart cards that provide information specific to an individual is becoming more prevalent in a number of different types of situations. Examples of such include electronic commerce, security access control and health care record maintenance.

Each system that employs smart cards contains two fundamental components, namely the smart cards themselves and an interface device, commonly known as a reader. The smart cards are carried by the users of the system, and include a memory that stores information that is pertinent to the user's interaction with the system. In an electronic commerce system, for example, each smart card contains the balance in an account maintained by the user, as well as details of account transactions. More recently, the smart cards also include microprocessors, which provide for an increased level of security over the information stored in the cards. The incorporation of microprocessors into the cards also enhances their flexibility, for instance by facilitating the storage of executable programs in the cards that can be used to provide expanded functionality.

The readers communicate with the cards in a secure manner to access the information stored therein. In one type of system, the card is inserted into a slot in the reader, which brings electrical contacts in the reader into engagement with mating contacts on the exterior of the card. The engaged contacts enable a microcontroller in the reader to communicate with the memory and/or microprocessor in the card. Typically, the reader is connected to a peripheral device that is associated with the particular type of system into which the reader is incorporated.

Desktop versions of smart card readers are used to verify a person's identity before the person is allowed to use a computer. Typically, the smart card reader is contained in an external accessory box module, connected to the computer through the non plug and play RS232 serial port, and using the RS232 protocol. The architecture of this reader is either a two or three chip solution, typically using the Intel 8048 or 8051 microprocessor. The setup is a complicated process, requiring the plugging in of the module to the serial port, the installation of drivers, and turning off and restarting the computer. What is needed is a plug-and-play solution for adding a smart card reader.

Another version of a smart card reader employs a single chip solution. This single chip firmware solution uses a non-standard interface with a keyboard controller. The problem with this solution is that it requires keyboard/firmware changes to make it work, which makes it difficult to support as an industry standard. What is needed is a smart card reader that integrates easily with a computer.

A smart card reader is also implemented through a PCI-to-PCMCIA (Personal Computer Memory Card International Association) host adapter and PCMCIA smart card reader. Currently computer operating systems (OS) support plug-and-play capabilities for PCI-to-PCMCIA adapters. An OS detects PCMCIA smart card reader by using a detection logic scheme that periodically checks the registers used by the PCI-PCMCIA host adapter. An OS, such as Microsoft Windows, supports plug-and-play for PCI-to-PCMCIA bridge adapters. The problem with PCI-to-PCMCIA bridge adapters is that they occupy a whole PCI slot and PCMCIA form factor smart card reader is expensive. This requires computer motherboards to contain an extra PCI slot. This results in increased costs. What is needed is a device that can implement a smart card reader without using an extra PCI slot.

SUMMARY OF THE INVENTION

The invention provides a plug-and-play smart card reader that easily integrates another computer function, such as a video controller. The smart card/video controller has a processor with embedded functions for controlling both video and smart card functions. The smart card/video controller responds to device detection queries in a fashion that simulates a PCI-to-PCMCIA bridge and a video card. The result, in the presently preferred embodiment of the invention, is a video and smart card reader controller that uses the same PCI slot.

DESCRIPTION OF THE PREFERRED EMBODIMENT

Figure 1:
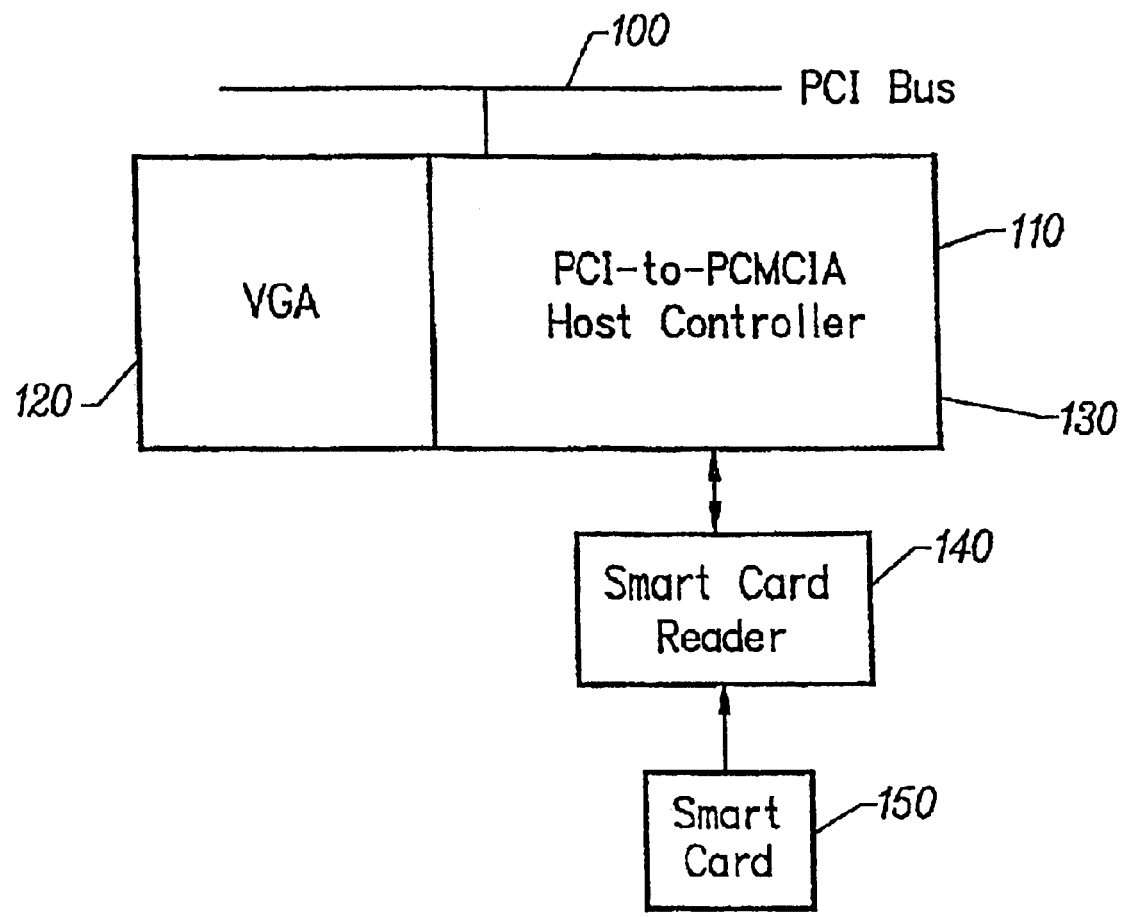
FIG. 1 is a diagram that illustrates the functional relationship of a smart card reader and a video/smart card reader controller according to the invention.

FIG. 1 is a diagram illustrating a smart card reader integrated within a video card (CARD) 110. The CARD 110 is attached to a computer motherboard through a PCI bus. The CARD processor contains embedded smart card reader functions 130, as well as video functions 120. The CARD 110 has an external lead that connects to a smart card reader 140 that can read smart cards 150. While Applicant has disclosed a PCI CARD herein, it will be appreciated by those skilled in the art that such CARD readily encompasses any device/steps, that can be substituted therefore to effect a similar result as is achieved by the CARD, including, but not limited to, CARDS with such functions as network cards, modems, video, memory devices, or core logic chipsets.

Figure 2:
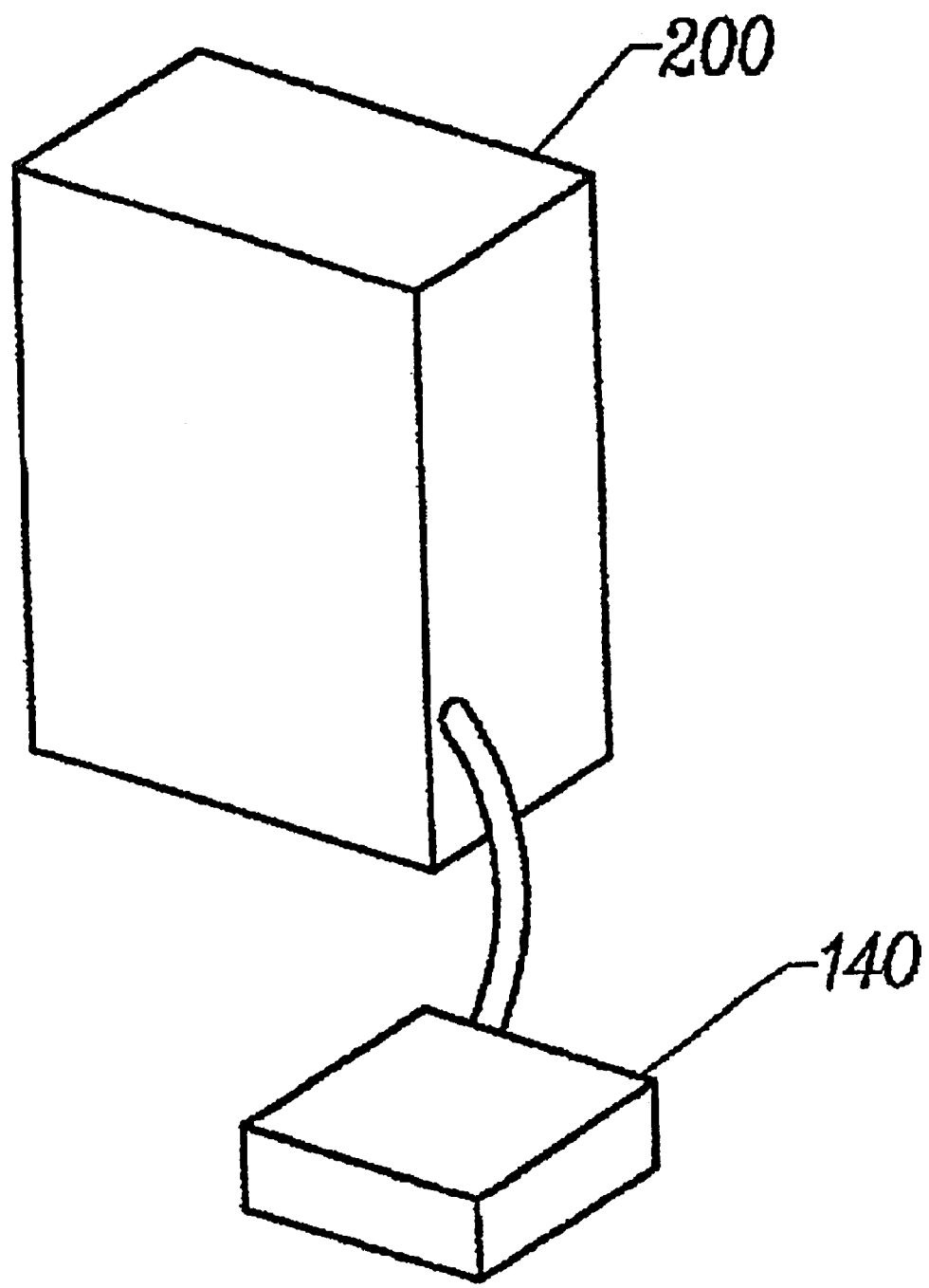
FIG. 2 is a diagram that illustrates an external view of a smart card reader connected to a computer according to the invention.

FIG. 2 illustrates an external view of a computer 200 with a smart card reader 140 attached through a wire lead to the back of the CARD.

The PCI bus architecture incorporates its configuration information in each PCI device. That is, in the preferred embodiment, a configuration space of 256 bytes is provided for every PCI compatible unit and every separate function in a multifunction unit. All PCI devices must implement this configuration space. The configuration space consists of configuration registers that provide a PCI based system information about a PCI device, and allows a device to be configured for use in a specific system.

The configuration space is divided into a predefined header region and a device dependent region. The predefined header region includes fields that uniquely identify the device and allow the device to be controlled generically. One piece of information that the configuration space header provides is a class code that identifies the function of the system. The configuration space also provides a header field, one bit of which indicates the presence of a multifunctional PCI device.

WINDOWS has a bus detection logic scheme that periodically checks the predefined header region of the bus to see what device is connected to the bus. Each region consists of a number of configuration registers. However, the detection logic scheme does not check all of the configuration registers. Thus, the CARD is designed to respond to those registers that are checked by WINDOWS for a PCI-to-PCMCIA bridge, accordingly, WINDOWS detects both a video card and a PCI-to-PCMCIA device. The CARD does this by responding to WINDOWS queries with variable responses to those registers similar to those responses that would be given by a dedicated PCI-to-PCMCIA bridge. Otherwise stated, WINDOWS detects a PCI-to-PCMCIA device that implements the entire configuration space. It is also contemplated that the PCMCIA bridge logic may also be used with ISA, VL, and other buses.

Figure 3:
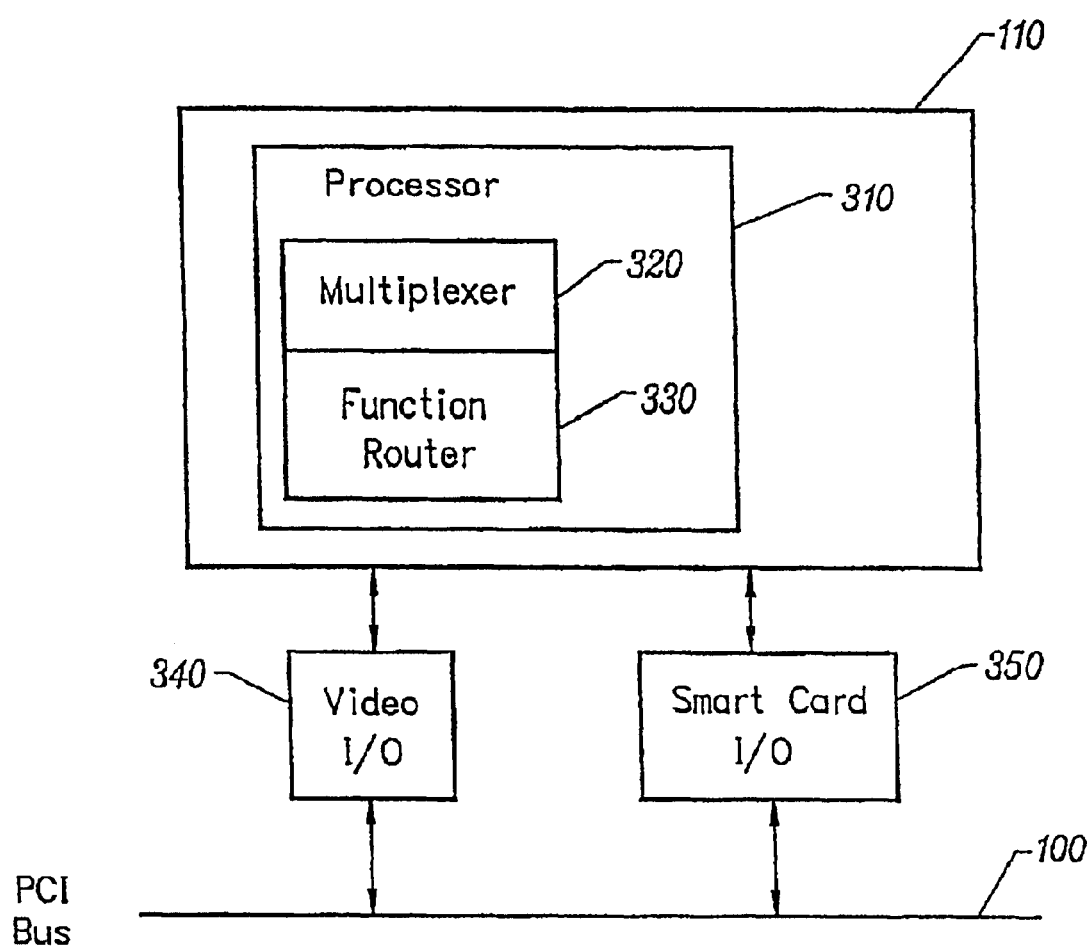
FIG. 3 is a diagram illustrating a processor having embedded functions for managing both video and smart card reader I/O functions according to the invention.

FIG. 3 illustrates a function router 330 included within the CARD processor 310 to connect the input and output (I/O) of the video 340 and smart card reader functions 350 to the PCI local bus 100. Typically, the function router 330 may be implemented with a multiplexer 320 such that data and/or control signals may be routed between the processor and I/O path 340, 350.

The configuration protocol defined within the PCI local bus specification allows the processor to individually address each PCI local bus device using a physical selection signal that is part of the PCI bus signal definitions. The specification further assigns to the CARD, a range of processor memory addresses by which the CPU communicates with the CARD.

The CARD 110 serves to collect multiple PCI I/O using a single PCI local bus connection. This arrangement is quite practical in that it allows for the evolution from larger physical components to more dense physical integration as components become smaller. Furthermore, this arrangement exploits dense packaging of multiple I/O devices to connect an overall increased number of devices without adding more connections on the PCI local bus or its backplane.

The function router 330 in the CARD 110 effectively replaces the two required PCI bus connections with a single PCI bus connection 100. To enable the processor 100 to select a particular I/O path within the CARD, the PCI bus specification configuration protocol appends a function number that ranges in value from 0 to 7 to the device identifier.

As mentioned, the PCI architecture allows for PCI devices with more than one function. The CARD provides a configuration space for each function implemented. That is, each function has its own set of configuration space registers. The CARD has two configuration spaces, i.e. one for the video controller and one for the smart card reader. The CARD typically, although not always, needs for more than one interrupt pin. Respective multiple configuration spaces are necessary when multiple interrupt pins are required by the multifunction device.

It may be desired to package a function along with the smart card functions separately and only have a PCI bus interface on one of the functions so that the other function(s) can be options and installed at the manufacturer's or buyer's discretion. Such a configuration can reduce the cost associated with implementing a full PCI bus interface for each function if the other functions are attached through some non-PCI bus interface to the primary function. Such a configuration also provides the benefit, for example, that a system would only have to implement desired function(s) and would save the cost associated with the functions that were not needed or wanted. Additionally, the system to which the multifunction device is coupled would have fewer loads on the PCI bus if multiple functions are implemented.

The CARD is architecturally capable of incorporating up to eight distinct functional elements within a single device that requires a single slot on the PCI local bus. The role of the function router 330 is to facilitate the sharing of the single slot amongst multiple I/O function incorporated within the CARD. In particular, during configuration read and write protocols, the function router 330 uses the function number from this protocol to route the arguments of this protocol between the PCI local bus 100 and the associated processor functions.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. An integrated expansion card occupying a single bus slot of a computer system, comprising: a first embedded device and a second embedded device wherein said first and second embedded devices are operable to share said single bus slot, said second embedded device comprising a bus host controller operable to input and output commands and data to said bus and to an expansion card device connected to said bus host controller; said second embedded device being capable of responding to registers that are queried by an operating system for a PCI-to-PCMCIA bridge so that said operating system detects the presence of a PCI-to-PCMCIA bridge.

2. An integrated expansion card as claimed in claim 1, wherein said first embedded device comprises a video controller.

3. An integrated expansion card as claimed in claim 1, wherein said first embedded device comprises a network controller.

4. An integrated expansion card as claimed in claim 1, wherein said first embedded device comprises a modem.

5. An integrated expansion card as claimed in claim 1, wherein said first embedded device comprises a memory device.

6. An integrated expansion card as claimed in claim 1, wherein said first embedded device comprises a core logic chipset associated with said computer system.

7. An integrated expansion card as claimed in claim 1, wherein said bus comprises a PCI bus, and said bus slot comprises a PCI bus slot for physically connecting said expansion card with said computer system.

8. An integrated expansion card as claimed in claim 1, wherein said second embedded device comprises a PCI-to-PCMCIA host controller.

9. An integrated expansion card as claimed in claim 1, wherein said expansion card device comprises a smart card reader.

10. An integrated expansion card as claimed in claim 1, further comprising a processor to connect the input and output of said first and second embedded devices and said expansion card device to said bus.

11. An integrated expansion card as claimed in claim 10, wherein said processor comprises configuration registers comprising a header region and a device dependent region for each said embedded devices, said header region comprising data to identify said embedded devices and device dependent region comprising data specific to said first or second embedded device.

12. An integrated expansion card as claimed in claim 1, said expansion card comprising a first input/output path and a second input/output path for communication between said first and second embedded devices, respectively, with said computer system.

13. An integrated expansion card as claimed in claim 12, further comprising a function router comprising a multiplexer to route data and control signals between a processor and said first or second input/output path.

14. An integrated, multifunction expansion card for a computer system, comprising:
 a first embedded device;
 a second embedded device comprising a PCI-to-PCMCIA host controller, said PCI-to-PCMCIA host controller being capable of responding to resisters that are queried by an operating system for a PCI-to-PCMCIA bridge so that said operating system detects the presence of a PCI-to-PCMCIA bridge;
 a first and second input/output paths for exchanging control signals and data between said first or second embedded device, respectively, and said computer system, via a single PCI bus connection;
 a third input/output path for exchanging control signals and data between said second embedded device and an expansion card device; and
 a function router for selecting said first embedded device or said second embedded device to operate via said first or second input/output path, respectively.

15. An integrated, multifunctional expansion card as claimed in claim 14, wherein said first embedded device is selected from the group consisting of a video controller, a network controller, a modem, a memory device, and a core logic associated with said computer system.

16. An integrated, multifunctional expansion card as claimed in claim 14, wherein said function router comprises a multiplexer to route data and/or control signals between the first or second embedded device and said first or second input/output paths, respectively.

17. An integrated, multifunctional expansion card as claimed in claim 14, where said PCI-to-PCMCIA host controller includes a PCI-to-PCMCIA bridge to permit said expansion card to exchange commands and data with said PCI bus.

* * * * *